Feb. 8, 1944.   A. Y. DODGE   2,341,084
CONSTANT VELOCITY UNIVERSAL JOINT
Filed May 11, 1940
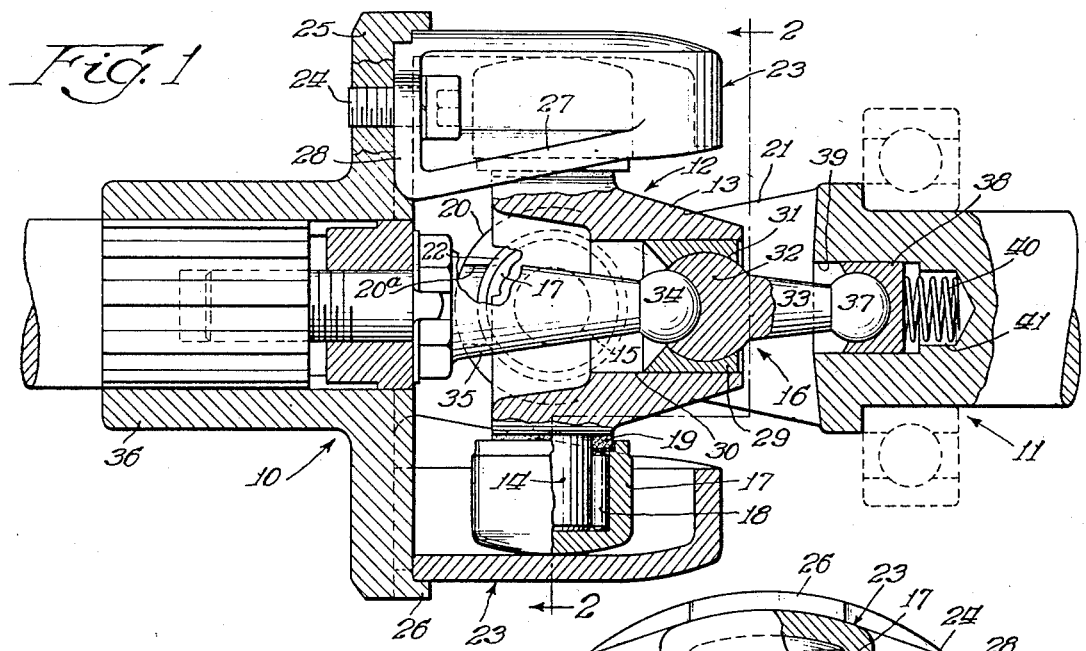
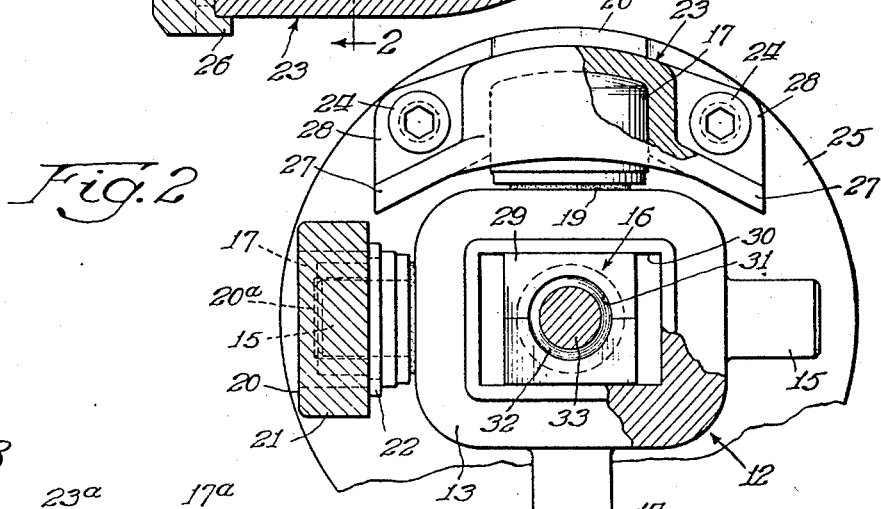
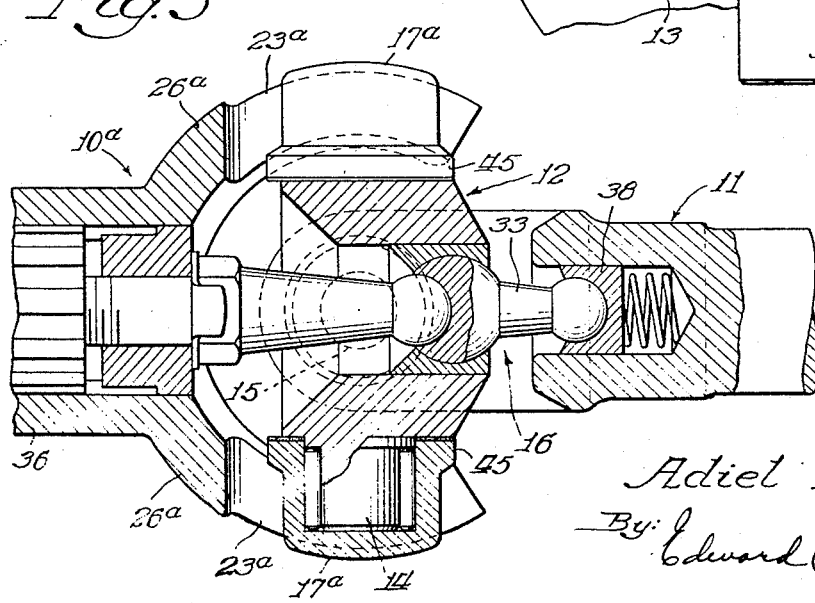
Inventor:
Adiel Y. Dodge
By: Edward C. Gritzbaugh
Atty.

Patented Feb. 8, 1944

2,341,084

UNITED STATES PATENT OFFICE 2,341,084

CONSTANT VELOCITY UNIVERSAL JOINT

Adiel Y. Dodge, Rockford, Ill., assignor to Borg-Warner Corporation, Chicago, Ill., a corporation of Illinois Application May 11, 1940, Serial No. 334,517

9 Claims. (Cl. 64—21)

The object of this invention is to provide an improved universal joint having at least substantially the characteristics of constant velocity and embodying the three axis principle.

While there have been many forms of constant velocity joints introduced, there are comparatively few in use for one or more of the following reasons: The designs proposed have been prohibitive in cost, excessively large in size to handle the required torque, and usually difficult to assemble. In the present invention, two or more of the above objections have been eliminated or reduced to a minimum, in a joint having at least substantially constant velocity characteristics.

The primary object of any constant velocity universal joint is to transmit torque from a driving member to a driven member in such a manner as to eliminate fluctuation in the angular velocity of the driven member. Such fluctuation is an inherent characteristic of the conventional Cardan type joint embodying a connecting member in the form of a spider having trunnions journalled in the yokes of the driving and driven members respectively.

It has been known to the art for some time that a substantially constant velocity joint can be constructed having as few as three axes of oscillation of its parts in addition to the two axes of rotation of the driving and driven members, respectively. The present invention embodies this principle in universal joints of maximum simplicity of construction.

In the various embodiments of my invention, I employ a spider member or its equivalent having two or four trunnions which provide the major axes of oscillation of the yoke members relative to the spider, and in each case have provided a subordinate axis or axes by allowing the trunnions to oscillate on an axis or axes 90° removed from the axes or axis of the trunnion.

In one of its aspects the invention aims to retain as far as possible the advantages which underlie the success of the conventional trunnion-type joint. One of the most important of these advantages is the virtual elimination of friction between the relatively shiftable coacting members through which torque is transmitted. To this end the invention contemplates, in this aspect, a universal joint embodying a four trunnion spider, a yoke in which two of the trunnions are journalled on a fixed axis, and a yoke in which the other two bearings are confined for oscillation on an axis at right angles to their common axis. Thus two of the torque transmitting connections have anti-friction characteristics identical to those of a conventional trunnion joint, while the other two connections have anti-friction characteristics that are fairly comparable.

Means are provided for positioning the axes of the oscillatable bearings in a plane constantly bisecting the angle of the yoke axes of rotation, so as to maintain the angular velocity of the driven member constantly the same as that of the driving member.

This arrangement secures the third axis without adding parts or weight or increasing the size of the joint.

A more detailed object of the invention is to provide a yoke which is formed with structurally independent bearing receiving sockets, thus facilitating the assembly and reducing the expense of construction.

Other objects, the advantages and uses of the invention will become more apparent after reading the following specification and claims, and after consideration of the drawing forming a part of the specification, wherein:

Fig. 1 is an axial sectional view of a universal joint embodying the invention.

Fig. 2 is a transverse sectional view taken as indicated by the line 2—2 of Fig. 1.

Fig. 3 is a longitudinal sectional view of a modified form of the invention.

As an example of one form in which the invention may be embodied, I have shown in Figs. 1, 2 and 3 a universal joint comprising a pair of yokes 10 and 11 connected by a spider 12. The spider 12 is cross-shaped, including a central hub 13 and two pairs of trunnions 14 and 15 projecting from the hub 90° apart. The hub 13 is offset axially from the plane of the trunnions 14 and 15 in order that it may be operative, in connection with control means shown generally at 16, to orient the axis of the trunnions 14 at all times in a position bisecting the angle between the axes of the yokes 10 and 11.

The trunnions 14 and 15 are received in bearing cups 17. Needle bearing rollers 18 are interposed between the cups 17 and the trunnions 14 and 15. Conventional bearing retainer and packing means 19 may be employed to retain the rollers 18 in the cups 17 and seal the spaces within the cups against the loss of lubricant with which such faces may be packed.

The bearing cups 17 of the trunnions 15 are snugly mounted in cylindrical sockets 20 formed integrally in the ends of the arms 21 of the yoke 11. Thus the axis of the trunnions 15 is fixed with respect to the yoke 11. This axis, about which the yoke 11 may oscillate with reference to the yoke 10, may be designated one of the major axes of the joint. The second major axis is the axis of the trunnions 14, around which the yoke 10 may oscillate with reference to the yoke 11.

To produce the third axis of the three axes mentioned above, the spider 12 is permitted to oscillate with reference to the yoke 10 on an axis at right angles to the axis of the trunnions 14, so as to permit the latter axis to be constantly maintained as the bisector of the two axes of rotation. This third axis coincides with the first axis, i. e., the axis of the trunnion 15, thereby eliminating parts, reducing weight, and simplifying the construction as a whole. Stated differently, the trunnions 15 perform the dual function of permitting the yoke 11 to oscillate relative to the yoke 10 and permitting the spider 12 to oscillate relative to both yokes.

For assembly purposes, at least one of the sockets 20 is in the form of a bore extending entirely through its arm 21 and of sufficient diameter to allow the bearing cup 17 to be passed therethrough. The socket is recessed as at 20a to permit the assembly of the trunnion 15. The cup 17 may be secured in the socket by a snap ring 22 (Fig. 2).

Oscillation of spider 12 relative to the yoke 10 is provided for by the axially elongated slideways 23 in which the bearing cups of the trunnions 14 are received, and through which torque is transmitted from the yoke 10 to the bearing caps.

The slideway 23 may be formed of sheet metal and coin pressed to provide the necessary accuracy. This is an inexpensive method of forming the ways. The bearings 17 are adapted to swing back and forth in the ways 23 as the spider 12 oscillates.

Ready assembly or disassembly of the joint is made posssible by forming the ways 23 separate from the yoke 10 and detachably securing the ways by means of cap screws 24 to a radial disc portion 25 of the yoke 10. The disc portion 25 is provided with peripheral axially extending flanges 26 against which the channels 23 are accurately located.

For the purpose of providing ample strength, the sockets 23 are formed with webs 27 joining the side walls of the sockets to the ear portions 28, through which the cap screws 24 extend. The webs 27 carry the torque forces between the ear portions 28 and the side walls of the sockets, reducing deflection to a practical minimum.

The control mechanism 16 comprises a sleeve 29 axially slidable in a slot 30 in the spider hub 13, and having a spherical socket 31 in which is pivoted the head 32 of a lever 33. In the head 32 is socketed the ball end 34 of a post 35 the other end of which is securely mounted in the hub 36 of the yoke 10. The other end of the lever 33 has a ball 37 pivoted in a socket 38 which is slidable in the bore 39 of the yoke 11.

The centers of the ball ends 34 and 37 and the head 32 are so related to the axis of the trunnions 14 as to maintain the latter constantly at the bisector of the axes of the yokes 10 and 11, within close limits.

The lever 33 is maintained in snug engagement with the post 35 at all times by a coil spring 40 engaged between the socket 38 and the shank of the yoke 11 in a bore 41 constituting a continuation of the bore 39.

The slot 30 is rectangular in shape, and is elongated transversely of the axis of the trunnions 14 so as to permit the spider hub 13 to swing laterally with reference to the post 35 around the axis of the trunnions 14. Such lateral swinging is occasioned by the oscillation of the spider around the axis of the trunnions 14 with reference to the yoke 10, which in turn is due to the fact that the axis of the trunnions 15 remains at all times at right angles to the axis of the yoke 11.

The form of the invention shown in Fig. 3 is the same in all respects as that shown in Fig. 1, with the exception that instead of the structurally independent sockets 23, the yoke 10a is provided with integral sockets 23a in the form of open notches in the ends of the yoke arms 26a, and the bearing caps 17a are provided with flanges 45 which coact with the radially inner surfaces of the sockets 23a so as to support the bearing caps against centrifugal force. Other parts of the joint are the same as shown in Figs. 1 and 2, and the same reference numerals are used to designate them.

It will now be seen that my invention provides a universal joint embodying the three axis principle, which is of maximum simplicity of construction, relatively inexpensive, easy to assemble and dismantle, and yet sturdy and long-lived.

I claim:

1. In a universal joint, a spider having four trunnions and a radially elongated central opening, a bearing encircling each trunnion, a pair of yokes in one of which two of said bearings are mounted on a fixed axis and in the other of which the other two bearings are slidably mounted for oscillating movement around said fixed axis, and means extending through said elongated opening and coacting with the spider on either side thereof for positioning the latter axis of said other two bearings at all times in the bisector of the yoke axes, said means being radially slidable in said opening.

2. A substantially constant velocity universal joint comprising a spider having four trunnions and a central aperture, a bearing encircling each trunnion, a pair of yoke members, one having a pair of diametrically opposed sockets in which alternate bearings are fixed and the other having a pair of diametrically opposed axially elongated slideways receiving the other bearings and permitting said other bearings to oscillate around the axis of said sockets with reference to said other yoke member, and means extending through said aperture and coacting with said spider and the respective yokes for positioning said spider to maintain the axis of said last-mentioned bearings at all times the bisector of the axes of the yoke members.

3. A universal joint as defined in claim 2, wherein said elongated slideways are structurally independent and detachably secured to said other yoke member.

4. In a universal joint, a spider having two pairs of trunnions, the trunnions of each pair being diametrically opposed, said spider having a central hub region offset axially from the plane of the trunnions, said hub region providing a slideway the longitudinal axis of which is parallel to the axis of one pair of trunnions, a pair of yokes in the arms of one of which said one pair of trunnions is journalled and in the arms of the other of which the other pair of trunnions is confined for oscillating movement around the axis of said first pair of trunnions, and spider control mechanism extending through said slideway and coacting therewith for maintaining said second pair of trunnions constantly in the bisector of the angle of the axes of said yokes.

5. In a universal joint, a spider having two pairs of trunnions, the trunnions of each pair being diametrically opposed, said spider including a central hub region axially offset from the plane of said trunnions, said hub region providing a slideway the longitudinal axis of which is parallel to the axis of one pair of said trunnions, a bearing encircling each trunnion, a pair of yoke members one having a pair of diametrically opposed sockets in which the bearings of said one pair of trunnions are fixed and the other having a pair of diametrically opposed axially elongated slideways in which the other two bearings are confined for oscillating movement around the axis of said one pair of trunnions, and spider control means including a post rigid with the yoke having said slideways and projecting into said hub, a slide member slidable in said hub slideway, and a lever one end of which is pivoted with reference to the other yoke member and the other end of which is universally socketed in said slide member and has a pivotal connection with the end of said post adapted to maintain the axis of the oscillatable trunnions constantly the bisector of the angle of the yoke members.

6. A substantially constant velocity universal joint comprising a driving member, a driven member, an intermediate torque transmitting element, a pair of diametrically opposed bearings connecting said intermediate element in torque transmitting relation to one of said members on an axis that is fixed with reference to said one member, a pair of diametrically opposed bearings connecting said intermediate element in torque transmitting relation to the other of said members, said other member including means in which the latter mentioned bearings are slidably mounted for oscillating movement around said fixed axis, and means cooperating with said driving and driven members and said intermediate element for maintaining the axis of said latter mentioned bearings at all times the bisector of the axes of the driving and driven members.

7. A substantially constant velocity universal joint comprising driving and driven members, an intermediate torque transmitting element having a central aperture, a pair of bearings connecting said intermediate element in torque transmitting relation to one of said members on an axis that is fixed relative to said one member, a pair of bearings connecting said intermediate element in torque transmitting relation to the other of said members, said other member including means in which the latter mentioned bearings are slidably mounted for oscillating movement around said fixed axis, and means extending through said aperture with clearance permitting radial shifting movement thereof in said aperture, said last means coacting with said intermediate element and said driving and driven members for maintaining the axis of said latter mentioned bearings at all times the bisector of the axes of the yoke members.

8. A substantial constant velocity universal joint comprising a spider having four trunnions and a central aperture, a bearing encircling each trunnion, driving and driven members, in one of which alternate bearings are fixed, and in the other of which the other two bearings are slidably mounted for oscillating movement around the axis of said fixed bearings, and means extending through said aperture with clearance permitting radial movement thereof relative to said spider, said means coacting with the spider and with said driving and driven members for positioning said spider to maintain the axis of said oscillatable bearings at all times the bisector of the axes of the yoke members.

9. A substantially constant velocity universal joint comprising driving and driven members, an intermediate element having a radially elongated central opening, a pair of bearings connecting said intermediate element to one of said members on an axis that is fixed with relation to said one member, a second pair of bearings connecting said intermediate element in torque transmitting relation to the other of said members, said other member having means in which said second pair of bearings are slidably mounted for oscillating movement around said fixed axis, and means extending through said elongated opening and coacting with said intermediate element for maintaining the axis of said second pair of bearings at all times the bisector of the axes of said driving and driven members, said means being radially slidable in said openings.

ADIEL Y. DODGE.

CERTIFICATE OF CORRECTION.

Patent No. 2,341,084.  February 8, 1944.

ADIEL Y. DODGE.

It is hereby certified that error appears in the printed specification of the above numbered patent requiring correction as follows: Page 2, second column, line 40, claim 1, after "the" strike out --latter--; and that the said Letters Patent should be read with this correction therein that the same may conform to the record of the case in the Patent Office.

Signed and sealed this 25th day of April, A. D. 1944.

Leslie Frazer

(Seal)  Acting Commissioner of Patents.